US011915880B2

(12) United States Patent
Chun et al.

(10) Patent No.: US 11,915,880 B2
(45) Date of Patent: Feb. 27, 2024

(54) MULTILAYER ELECTRONIC COMPONENT INCLUDING SIDE MARGIN PORTION HAVING COMPOSITION GRADIENT ACROSS THICKNESS THEREOF

(71) Applicant: SAMSUNG ELECTRO-MECHANICS CO., LTD., Suwon-si (KR)

(72) Inventors: Hee Sun Chun, Suwon-si (KR); Hyoung Uk Kim, Suwon-si (KR); Jae Sung Park, Suwon-si (KR); Hyeg Soon An, Suwon-si (KR); Ku Tak Lee, Suwon-si (KR); Eun Ha Jang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 108 days.

(21) Appl. No.: 17/499,103

(22) Filed: Oct. 12, 2021

(65) Prior Publication Data

US 2022/0230809 A1 Jul. 21, 2022

(30) Foreign Application Priority Data

Jan. 18, 2021 (KR) ........................ 10-2021-0006926

(51) Int. Cl.
*H01G 4/30* (2006.01)
*C04B 35/468* (2006.01)
*H01G 4/012* (2006.01)
*H01G 4/12* (2006.01)
(Continued)

(52) U.S. Cl.
CPC ........... *H01G 4/30* (2013.01); *C04B 35/4682* (2013.01); *H01G 4/012* (2013.01); *H01G 4/1227* (2013.01); *H01G 4/224* (2013.01); *C04B 35/64* (2013.01)

(58) Field of Classification Search
CPC ........ H01G 4/30; H01G 4/012; H01G 4/1227; H01G 4/224; H01G 4/1218; H01G 4/1209; H01G 4/005; C04B 35/4682; C04B 35/64; C04B 2235/3206; C04B 2235/3217; C04B 2235/3224; C04B 2235/3418; C04B 2235/782; C04B 2235/784; C04B 2235/85; C04B 2237/346; C04B 2237/68
See application file for complete search history.

(56) References Cited

U.S. PATENT DOCUMENTS

2007/0142209 A1* 6/2007 Ito ........................... B32B 18/00
501/137
2009/0088315 A1* 4/2009 Seki ...................... C04B 35/486
501/139
(Continued)

FOREIGN PATENT DOCUMENTS

JP 2017-147429 A 8/2017
KR 10-2019-0067683 A 6/2019

*Primary Examiner* — David M Sinclair
*Assistant Examiner* — Daniel M Dubuisson
(74) *Attorney, Agent, or Firm* — MORGAN, LEWIS & BOCKIUS LLP

(57) ABSTRACT

A multilayer electronic component includes a body including a plurality of dielectric layers, side margin portions disposed on the body, and external electrodes disposed on the body. The reliability of the multilayer electronic component is improved by controlling the contents of Si for each position of the dielectric layer and the side margin portion.

18 Claims, 7 Drawing Sheets

(51) Int. Cl.
*H01G 4/224* (2006.01)
*C04B 35/64* (2006.01)

(56) References Cited

U.S. PATENT DOCUMENTS

| | | | | |
|---|---|---|---|---|
| 2012/0262840 | A1* | 10/2012 | Koizumi | H01G 4/12 |
| | | | | 361/321.2 |
| 2013/0083450 | A1* | 4/2013 | Yoon | H01G 4/1227 |
| | | | | 361/321.4 |
| 2014/0301013 | A1* | 10/2014 | Kim | H01G 4/01 |
| | | | | 29/25.03 |
| 2015/0103467 | A1* | 4/2015 | Okamoto | H01G 4/30 |
| | | | | 29/25.42 |
| 2016/0020025 | A1* | 1/2016 | Yao | C04B 35/62685 |
| | | | | 361/301.4 |
| 2016/0351335 | A1* | 12/2016 | Kato | H01G 4/232 |
| 2017/0076865 | A1* | 3/2017 | Tanaka | H01G 4/232 |
| 2017/0076868 | A1* | 3/2017 | Noda | H01G 4/232 |
| 2017/0169952 | A1* | 6/2017 | Kato | H01G 4/2325 |
| 2017/0243697 | A1 | 8/2017 | Mizuno et al. | |
| 2019/0180936 | A1 | 6/2019 | Cha et al. | |
| 2019/0259536 | A1* | 8/2019 | Murosawa | H01G 4/1209 |
| 2020/0066446 | A1* | 2/2020 | Fukunaga | H01G 4/2325 |
| 2020/0258689 | A1* | 8/2020 | Kato | H01G 4/0085 |
| 2020/0303125 | A1* | 9/2020 | Tsuru | B32B 18/00 |
| 2020/0312568 | A1* | 10/2020 | Harada | H01G 4/232 |
| 2020/0312569 | A1* | 10/2020 | Uchida | H01G 4/30 |
| 2020/0365328 | A1* | 11/2020 | Mizuno | H01G 4/224 |
| 2021/0202180 | A1* | 7/2021 | Fukunaga | H01G 4/012 |
| 2022/0102076 | A1* | 3/2022 | Isota | H01G 4/012 |
| 2022/0139631 | A1* | 5/2022 | Yoshida | H01G 4/012 |
| | | | | 361/301.4 |

\* cited by examiner

MULTILAYER ELECTRONIC COMPONENT INCLUDING SIDE MARGIN PORTION HAVING COMPOSITION GRADIENT ACROSS THICKNESS THEREOF

CROSS-REFERENCE TO RELATED APPLICATION(S)

This application claims the benefit of priority to Korean Patent Application No. 10-2021-0006926 filed on Jan. 18, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, is a chip-type condenser mounted on a printed circuit board of several electronic products such as an image device, for example, a liquid crystal display (LCD), a plasma display panel (PDP) or the like, a computer, a smartphone, a mobile phone, and the like, to serve to charge or discharge electricity therein or therefrom.

The multilayer ceramic capacitor may be used as components of various electronic apparatuses since it has a small size, implements high capacitance, and may be easily mounted. In accordance with miniaturization and an increase in output of various electronic apparatuses such as computers and mobile devices, a demand for miniaturization and a capacitance increase of the multilayer ceramic capacitors has increased.

In addition, recently, in accordance with an increase in an interest in electronic components for a vehicle in the industry, the multilayer ceramic capacitors have also been required to have high reliability and high strength characteristics in order to be used in the vehicle or an infotainment system.

In order to miniaturize the multilayer ceramic capacitor and increase a capacitance of the multilayer ceramic capacitor, it has been required to significantly increase an electrode effective area (increase an effective volume fraction required for implementing a capacitance).

In order to implement the miniaturized and high-capacitance multilayer ceramic capacitor as described above, in manufacturing the multilayer ceramic capacitor, a method of significantly increasing areas of internal electrodes in a width direction of a body through a design that does not have margins by exposing the internal electrodes in the width direction of the body and separately attaching side margin portions to electrode exposed surfaces of the multilayer ceramic capacitor in the width direction in an operation after the multilayer ceramic capacitor is manufactured and before the multilayer ceramic capacitor is sintered to complete the multilayer ceramic capacitor has been used.

Capacitance of the multilayer ceramic capacitor per unit volume of the multilayer capacitor may be improved by a method of separately attaching the side margin portions, but there is a problem that moisture resistance reliability of the multilayer ceramic capacitor may be decreased due to a decrease in a thickness of the side margin portions. In addition, when the method of separately attaching the side margin portions is used, in general, an average size of dielectric grains of the side margin portion may become greater than a size of dielectric grains of an active portion, and a problem in which reliability of the multilayer ceramic capacitor is decreased due to a difference in the size between the dielectric grains of the active portion and the side margin portion may occur.

Therefore, a method of improving reliability of the multilayer ceramic capacitor by suppressing grain growth of the side margin portion to decrease the difference in the size between the dielectric grains of the side margin portion and a dielectric layer of the active portion has been required.

SUMMARY

An aspect of the present disclosure may provide a multilayer electronic component of which reliability is improved.

Another aspect of the present disclosure may provide a multilayer electronic component in which a difference in size between dielectric grains of an active portion and a side margin portion is decreased.

An aspect of the present disclosure may provide a multilayer electronic component having high reliability, a small size, and high capacitance.

According to an aspect of the present disclosure, a multilayer electronic component may include: a body including a plurality of dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction; side margin portions disposed on the fifth and sixth surfaces, respectively; and external electrodes disposed on the third and fourth surfaces, respectively, wherein the body includes an active portion including internal electrodes disposed alternately with the dielectric layers in the first direction and cover portions disposed on opposite end surfaces of the active portion in the first direction, respectively, and the dielectric layer and the side margin portion include Si, and an average content of Si in m is higher than an average content of Si in a and an average content of Si in m2 in which a is a region from a boundary between the active portion and the side margin portion to a region spaced apart from the boundary toward the active portion by 3 μm, m is a region from the boundary between the active portion and the side margin portion to a region spaced apart from the boundary outwardly of the side margin portion by 3 μm, and m2 is a region from m to a region spaced apart from m outwardly of the side margin portion by 3 μm.

According to another aspect of the present disclosure, a multilayer electronic component may include: a body including a plurality of dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction; side margin portions disposed on the fifth and sixth surfaces, respectively; and external electrodes disposed on the third and fourth surfaces, respectively, wherein the body includes an active portion including internal electrodes disposed alternately with the dielectric layers in the first direction and cover portions disposed on opposite end surfaces of the active portion in the first direction, respectively, and Dm/Da is greater than 0.5 and less than 1.5 in which a is a region from a boundary between the active portion and the side margin portion to a region spaced apart from the boundary toward the active portion by 3 μm, Da is an average size of dielectric grains in a, m is a region from the boundary between the active portion and the side margin portion to a region spaced apart from the boundary outwardly of the side margin portion by 3 μm, and Dm is an average size of dielectric grains in m.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
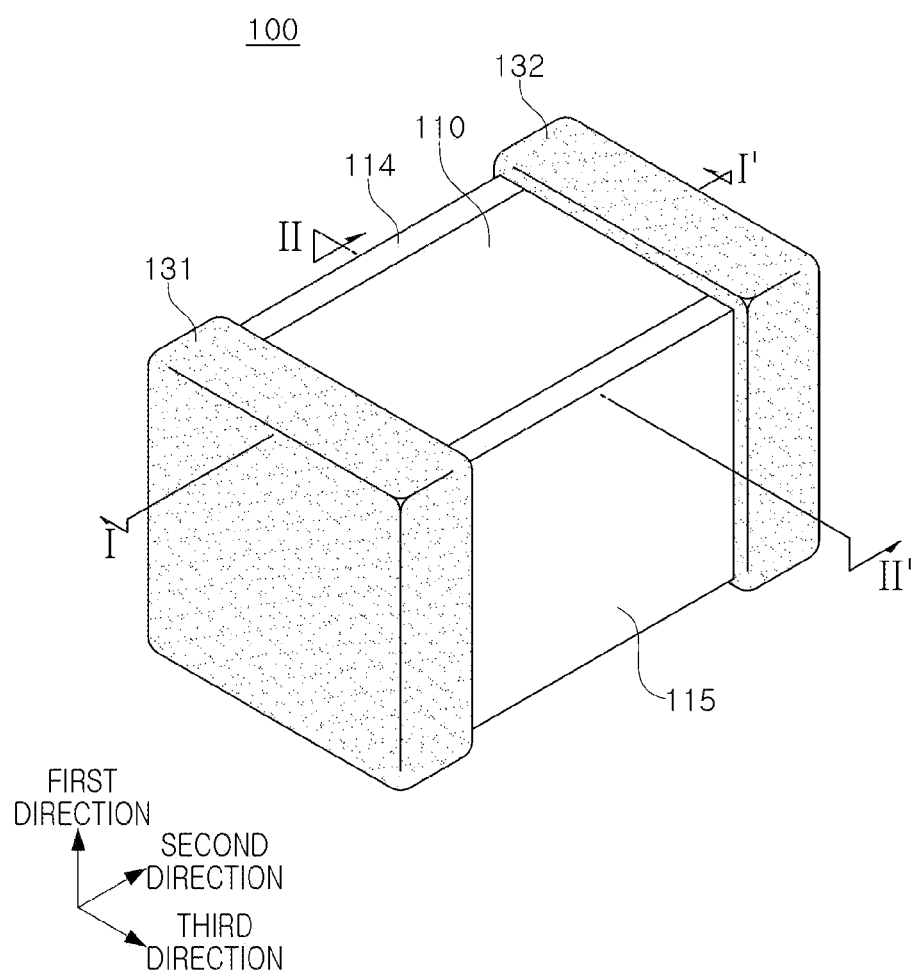
FIG. 1 is a schematic perspective view illustrating a multilayer electronic component according to an exemplary embodiment in the present disclosure.

Hereinafter, exemplary embodiments of the present disclosure will now be described in detail with reference to the accompanying drawings. The shape and size of constituent elements in the drawings may be exaggerated or reduced for clarity. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

The contents of the present disclosure described below may have a variety of configurations and propose only a required configuration herein, but are not limited thereto.

In the drawings, a first direction may be defined as a stacked direction or a thickness T direction, a second direction may be defined as a length L direction, and a third direction may be defined as a width W direction.

Multilayer Electronic Component

FIG. 1 is a schematic perspective view illustrating a multilayer electronic component according to an exemplary embodiment in the present disclosure.

Figure 2:
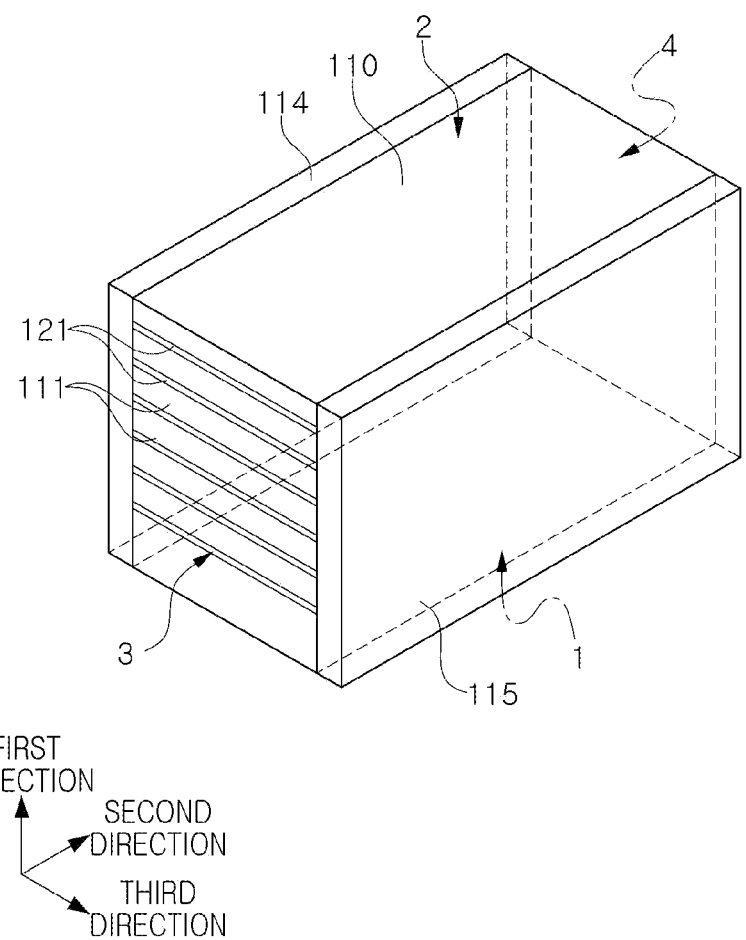
FIG. 2 is a perspective view illustrating a body in a state in which external electrodes are excluded from the multilayer electronic component of FIG. 1.

FIG. 2 is a perspective view illustrating a body in a state in which external electrodes are excluded from the multilayer electronic component of FIG. 1.

Figure 3:
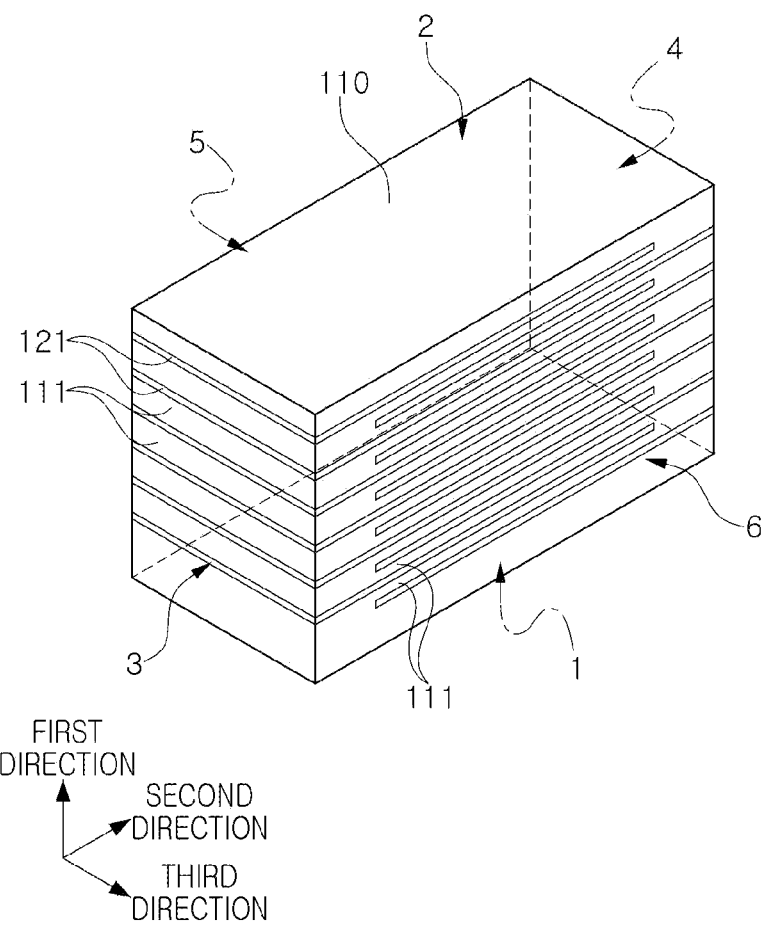
FIG. 3 is a perspective view illustrating the body in a state in which the external electrodes and side margin portions are excluded from the multilayer electronic component of FIG. 1.

FIG. 3 is a perspective view illustrating the body in a state in which the external electrodes and side margin portions are excluded from the multilayer electronic component of FIG. 1.

Figure 4:
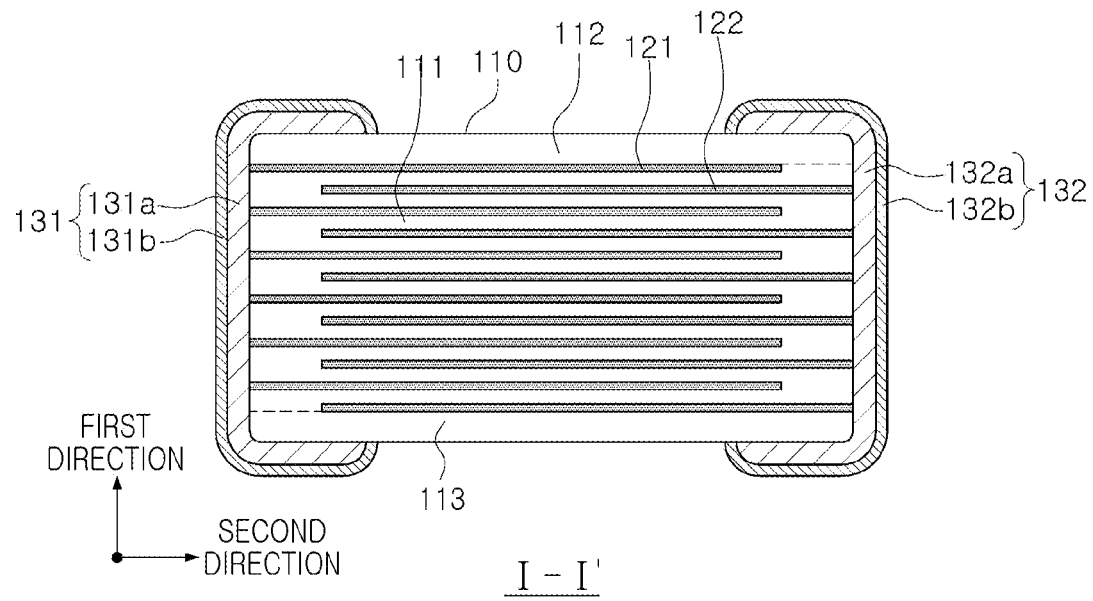
FIG. 4 is a cross-sectional view taken along line I-I' of FIG. 1.

FIG. 4 is a cross-sectional view taken along line I-I' of FIG. 1.

Figure 5:
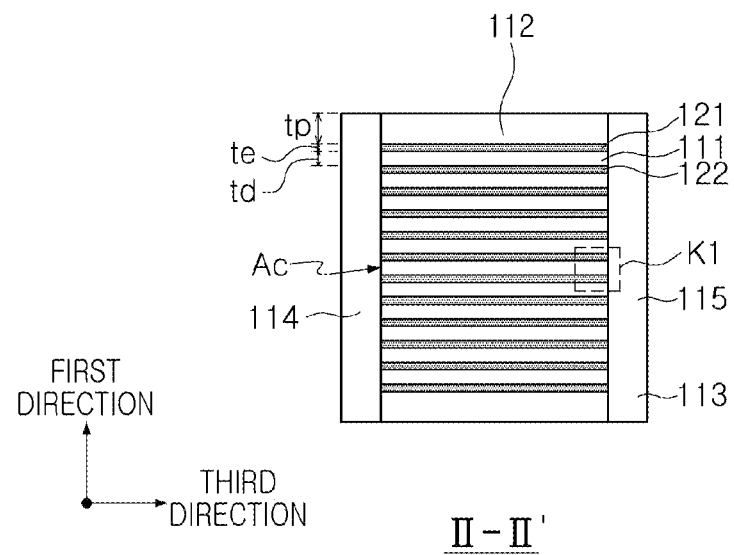
FIG. 5 is a cross-sectional view taken along line II-II' of FIG. 1.

FIG. 5 is a cross-sectional view taken along line II-II' of FIG. 1.

Figure 6:
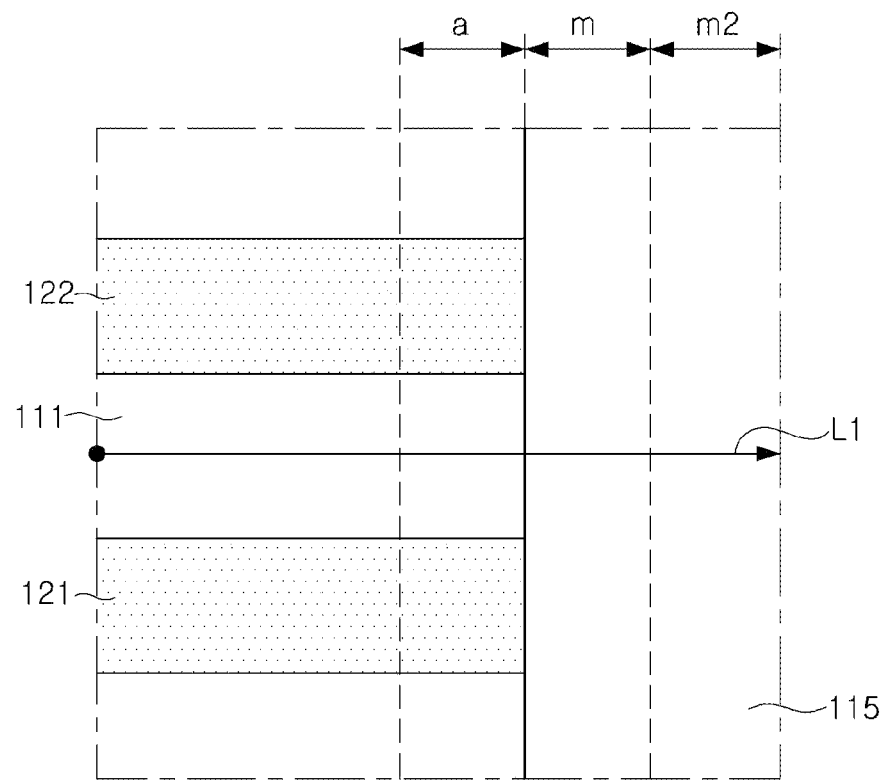
FIG. 6 is an enlarged view of region K1 of FIG. 5.

FIG. 6 is an enlarged view of region K1 of FIG. 5.

Hereinafter, a multilayer electronic component according to an exemplary embodiment in the present disclosure will be described in detail with reference to FIGS. 1 through 6.

A multilayer electronic component 100 according to an exemplary embodiment in the present disclosure may include: a body 110 including a plurality of dielectric layers 111 and having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; side margin portions 114 and 115 disposed on the fifth and sixth surfaces, respectively; and external electrodes 131 and 132 disposed on third and fourth surfaces, respectively, wherein the body includes an active portion Ac including internal electrodes 121 and 122 disposed alternately with the dielectric layers and cover portions 112 and 113 disposed on upper and lower surfaces of the active portion in the first direction, respectively, and the dielectric layer and the side margin portion include Si, and an average content of Si in m is higher than an average content of Si in a and an average content of Si in m2 in which a is a region from a boundary between the active portion and the side margin portion to a region spaced apart from the boundary toward the active portion by 3 µm, m is a region from the boundary between the active portion and the side margin portion to a region spaced apart from the boundary outwardly of the side margin portion by 3 µm, and m2 is a region from m to a region spaced apart from m outwardly of the side margin portion by 3 µm.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powders included in the body 110 in a sintering process, the body 110 may have a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer 111 is not particularly limited as long as sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powders. Examples of the $BaTiO_3$-based ceramic powders may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially solid-dissolved in $BaTiO_3$.

A material of the dielectric layer 111 may include various ceramic additives, organic solvents, binders, dispersants, and the like, added to powders such as barium titanate ($BaTiO_3$) powders, or the like, according to an object of the present disclosure.

Meanwhile, a thickness td of the dielectric layer 111 does not need to be particularly limited. However, the thickness td of the dielectric layer 111 may be 0.6 µm or less in order to more easily achieve miniaturization and an increase in capacitance of the multilayer electronic component. Here, the thickness td of the dielectric layer 111 may refer to an average thickness of the dielectric layer 111.

The body 110 may include the active portion Ac disposed in the body 110 and forming capacitance by including first internal electrodes 121 and second internal electrodes 122 disposed to face each other with respective dielectric layers 111 interposed therebetween and the cover portions 112 and 113 formed on upper and lower surfaces of the active portion Ac in the first direction, respectively.

In addition, the active portion Ac, which contributes to forming capacitance of a multilayer ceramic capacitor, may be formed by repeatedly stacking a plurality of first and second internal electrodes 121 and 122 with respective dielectric layers 111 interposed therebetween.

The upper cover portion 112 and the lower cover portion 113 may be formed by stacking a single dielectric layer or two or more dielectric layers on the upper and lower surfaces of the active portion Ac in the thickness direction, respectively, and may basically serve to prevent damage to the internal electrodes due to physical or chemical stress.

The upper cover portion 112 and the lower cover portion 113 may not include the internal electrodes, and may include the same material as the dielectric layer 111.

That is, the upper cover portion 112 and the lower cover portion 113 may include a ceramic material such as a barium titanate ($BaTiO_3$)-based ceramic material.

Meanwhile, a thickness of respective cover portions 112 and 113 does not need to be particularly limited. However, the thickness tp of respective cover portions 112 and 113 may be 20 µm or less in order to more easily achieve miniaturization and a capacitance increase of the multilayer electronic component.

In addition, the side margin portions 114 and 115 may be disposed on side surfaces of the active portion Ac.

The side margin portions 114 and 115 may include a first side margin portion 114 disposed on the fifth surface 5 of the body 110 and a second side margin portion 115 disposed on the sixth surface 6. That is, the side margin portions 114 and 115 may be disposed on opposite end surfaces of the body 110 in the third direction, respectively.

The side margin portions 114 and 115 may serve to prevent damage to the internal electrodes due to physical or chemical stress.

The side margin portions 114 and 115 may be formed by stacking ceramic green sheets to form a laminate, cutting the laminate so that the internal electrodes are exposed to the fifth and sixth surfaces 5 and 6 of the body, and then stacking a single dielectric layer or two or more dielectric layers on opposite end surfaces of the active portion Ac in the width direction, in order to suppress an operation due to the internal electrodes 121 and 122.

Referring to FIG. 6, the dielectric layer 111 and the side margin portions 114 and 115 may include Si, and an average content of Si in m may be higher than an average content of Si in a and an average content of Si in m2 in which a is a region from a boundary between the active portion Ac and respective side margin portions 114 and 115 to a region spaced apart from the boundary toward the active portion Ac by about 3 µm, m is a region from the boundary between the active portion Ac and respective side margin portions 114 and 115 to a region spaced apart from the boundary outwardly of respective side margin portions 114 and 115 by about 3 µm, and m2 is a region from m to a region spaced apart from m outwardly of respective side margin portions 114 and 115 by about 3 µm. Meanwhile, FIG. 6 illustrates the second side margin portion 115, but the above description is not limited to the second side margin portion 115 and may be similarly applied to the first side margin portion 114.

It will be appreciated that the term "about" in reference to a quantity is indicative of variation in the quantity such as those caused by manufacturing differences and measurement tolerances.

In order to implement a miniature and high-capacitance multilayer ceramic capacitor, in manufacturing the multilayer ceramic capacitor, a method of significantly increasing areas of internal electrodes in a width direction of a body through a design that does not have margins by exposing the internal electrodes in the width direction of the body and separately attaching side margin portions to electrode exposed surfaces of the multilayer ceramic capacitor in the width direction in an operation after the multilayer ceramic capacitor is manufactured and before the multilayer ceramic capacitor is sintered to complete the multilayer ceramic capacitor has been used. When the method of separately attaching the side margin portions is used, in general, an average size of dielectric grains of the side margin portion become greater than a size of dielectric grains of an active portion, and a problem that reliability of the multilayer ceramic capacitor is decreased due to a difference in the size between the dielectric grains of the active portion and the side margin portion may occur.

When a ceramic green sheet for forming the side margin portion and a ceramic green sheet for forming the dielectric layer have the same composition, in general, after the ceramic green sheets are subjected to stacking and sintering processes, an average content of Si in m2 may be the highest, and dielectric grains in m may be excessively grown, such that a size of the dielectric grains may increase.

On the other hand, according to an exemplary embodiment in the present disclosure, by controlling the average content of Si in m to be higher than the average content of Si in a and the average content in Si in m2, m may have a composition advantageous for low-temperature compactness, such that reliability of the multilayer electronic component may be improved. Si may be an element contributing to low-temperature compactness through liquefaction during sintering. Therefore, by controlling the content of Si in m to be relatively higher than those of Si in a and m2, m may have the composition advantageous for the low-temperature compactness, such that an increase in a size of the dielectric grains in m may be suppressed. As a result, compactness in m in which a breakdown due to a high voltage may mainly occur may be improved and a difference between the size of the dielectric grains in m and a size of the dielectric grains of the active portion may be decreased to improve reliability.

In an exemplary embodiment, Dm/Da may be greater than 0.5 and less than 1.5 in which Da is an average size of dielectric grains in a and Dm is an average size of dielectric grains in m.

When Dm/Da is 0.5 or less or 1.5 or more, the difference in the size between the dielectric crystal grains of the active portion Ac and respective side margin portions 114 and 115 may be increased, such that the reliability of the multilayer electronic component may be decreased. Therefore, Dm/Da may preferably be greater than 0.5 and less than 1.5, and be more preferably 0.88 or more and 1.38 or less.

In this case, average sizes Da and Dm of the dielectric grains for each position may be sizes measured in a cross section of the body in the first and third direction. In addition, the average sizes Da and Dm of the dielectric grains for each position may be sizes measured in a cross section of the body cut in the first and third direction at the center of the body in the second direction.

In an exemplary embodiment, the dielectric layer and the side margin portion may further include aluminum (Al), and an average content of Al in m may be higher than an average content of Al in a and an average content of Al in m2.

Al may also be an element contributing to low-temperature compactness through liquefaction during sintering, similar to Si. Therefore, by controlling the content of Al in m to be relatively higher than those of Al in a and m2, m may have a composition advantageous for low-temperature compactness, such that an increase in a size of the dielectric grains in m may be suppressed. As a result, compactness in m in which a breakdown due to a high voltage may mainly occur may be improved and a difference between the size of the dielectric grains in m and a size of the dielectric grains of the active portion may be decreased to improve reliability.

In an exemplary embodiment, peak values of the content of Si and the content of Al in m may be higher than those of the content of Si and the content of Al in m2.

When a ceramic green sheet for forming the side margin portion and a ceramic green sheet for forming the dielectric layer have the same composition, the content of Si and the content of Al may generally have peak values in m2.

On the other hand, according to an exemplary embodiment in the present disclosure, the content of Si and the content of Al may have peak values in m. However, the content of Si and the content of Al may also have peak values in m2, but the peak values of the content of Si and the content of Al in m may be higher than those of the content of Si and the content of Al in m2. Therefore, the difference in the size between the dielectric grains of the active portion Ac and respective side margin portions 114 and 115 may be decreased to improve the reliability.

In an exemplary embodiment, a distance difference between a point at which the content of Si has the peak value in m and a point at which the content of Al has the peak value in m may be 0.3 μm or less. That is, the content of Al in m may show the same distribution behavior as that of the content of Si. In this case, the content of Si and the content of Al in m may have the peak values at the same point.

Meanwhile, specific numerical ranges of the content of Si and the content of Al in m may be determined in consideration of various conditions such as a product specification and a manufacturing condition, and thus, does not need to be particularly limited.

As a non-restrictive example, the average content of Si in m may be 2 mol or more and 7 mol or less based on 100 mol of $BaTiO_3$, and the average content of Al in m may be 1.5 mol or more and 3 mol or less based on 100 mol of $BaTiO_3$.

In an exemplary embodiment, the dielectric layer 111 and the side margin portions 114 and 115 may further include one or more of Mg and Dy.

In an exemplary embodiment, the dielectric layers 111 may be formed by stacking first ceramic green sheets in the first direction, and the side margin portions 114 and 115 may be formed by stacking second ceramic green sheets on the opposite end surfaces of the active portion Ac in the third direction.

In this case, $0.4 < C1a/C2a < 1$ and $0.5 < C1b/C2b < 2$ in which C1a and C1b are contents of Si and Al based on 100 mol of $BaTiO_3$ of the first ceramic green sheet, respectively, and C2a and C2b are contents of Si and Al based on 100 mol of $BaTiO_3$ of the second ceramic green sheet, respectively. Therefore, after stacking and sintering, the average content of Si in m higher than the average content of Si in a and the average content of Si m2 may secured, and the average content of Al in m higher than the average content of Al in a and the average content of Al m2 may secured.

The internal electrodes 121 and 122 may be disposed alternately with the dielectric layer 111.

The internal electrodes 121 and 122 may include first and second internal electrodes 121 and 122. The first and second internal electrodes 121 and 122 may be alternately disposed to face each other with respective dielectric layers 111 constituting the body 110 interposed therebetween, and may be exposed to the third and fourth surfaces 3 and 4 of the body 110, respectively.

Referring to FIG. 3, the first internal electrodes 121 may be spaced apart from the fourth surface 4 and be exposed through the third surface 3, and the second internal electrodes 122 may be spaced apart from the third surface 3 and be exposed through the fourth surface 4. In addition, the first internal electrodes 121 may be exposed through the third, fifth and sixth surfaces 3, 5, and 6, and the second internal electrodes 122 may be exposed through the fourth, fifth and sixth surfaces 4, 5, and 6.

In this case, the first and second internal electrodes 121 and 122 may be electrically separated from each other by respective dielectric layers 111 disposed therebetween.

The internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Meanwhile, a thickness te of respective internal electrodes 121 and 122 does not need to be particularly limited. However, the thickness te of respective internal electrodes 121 and 122 may be 0.6 μm or less in order to more easily achieve miniaturization and an increase in capacitance of the multilayer electronic component. Here, the thickness te of respective internal electrodes 121 and 122 may refer to an average thickness of respective first and second internal electrodes 121 and 122.

The external electrodes 131 and 132 are disposed on the third surface 3 and the fourth surface 4 of the body 110, respectively.

The external electrodes 131 and 132 may include first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover opposite end surfaces of the side margin portions 114 and 115 in the second direction, respectively.

A structure in which the multilayer electronic component 100 includes two external electrodes 131 and 132 has been described in the present exemplary embodiment, but the number, shapes or the like, of external electrodes 131 and 132 may be changed depending on shapes of the internal electrodes 121 and 122 or other purposes.

In an exemplary embodiment, the external electrodes 131 and 132 may include the first external electrode 131 disposed on the third surface of the body 110 and the second external electrode 132 disposed on the fourth surface of the body 100 and the internal electrodes 121 and 122 may include the first internal electrodes 121 in contact with the first external electrode 131 and the second internal electrodes 122 in contact with the second external electrode 132, and both end portions of the first and second internal electrodes 121 and 122 in the third direction may be in contact with the side margin portions 114 and 115.

Meanwhile, the external electrodes 131 and 132 may be formed of any material having electrical conductivity, such as a metal, a specific material of respective external electrodes 131 and 132 may be determined in consideration of electrical characteristics, structural stability and the like, and the external electrodes 131 and 132 may have a multilayer structure.

For example, the external electrodes 131 and 132 may include, respectively, electrode layers 131a and 132a disposed on the body 110, and plating layers 131b and 132b each disposed on the electrode layers 131a and 132a.

As a more specific example of the electrode layers 131a and 132a, the electrode layers 131a and 132a may be fired electrodes including a conductive metal and glass or resin-based electrodes including a conductive metal or a resin.

Alternatively, the electrode layers 131a and 132a may have a form in which fired electrodes and resin electrodes are sequentially formed on the body. In addition, the electrode layers 131a and 132a may be formed in a manner of transferring a sheet including a conductive metal onto the body or be formed in a manner of transferring a sheet including a conductive metal onto a fired electrode.

The conductive metal included in the electrode layers 131a and 132a may be a material having excellent electrical connectivity, but is not particularly limited thereto. For example, the conductive metal may be one or more of nickel (Ni), copper (Cu), and alloys thereof.

The plating layers 131b and 132b may serve to improve mounting characteristics of the multilayer electronic component. A type of the plating layers 131b and 132b is not particularly limited. That is, respective plating layers 131b and 132b may be a plating layer including one or more of Ni, Sn, Pd, and alloys thereof, and may be formed as a plurality of layers.

As a more specific example of the plating layers 131b and 132b, the plating layers 131b and 132b may be Ni plating layers or Sn plating layers, may have a form in which Ni plating layers and Sn plating layers are sequentially formed on the electrode layers 131a and 132a, respectively, or may have a form in which Sn plating layers, Ni plating layers, and Sn plating layers are sequentially formed. Alternatively, the plating layers 131b and 132b may include a plurality of Ni plating layers and/or a plurality of Sn plating layers.

A size of the multilayer electronic component 100 need not be particularly limited.

However, since the numbers of stacked dielectric layers and internal electrodes need to be increased by decreasing thicknesses of the dielectric layers and the internal electrodes in order to achieve both of the miniaturization and the capacitance increase of the multilayer electronic component, a reliability improving effect according to the present disclosure in a multilayer electronic component 100 having a size of 1005 (length×width: 1.0 mm×0.5 mm) or less may become more remarkable.

Inventive Example

Sample chips were manufactured by adjusting contents of Si and contents of Al in a ceramic green sheet for an active portion and a ceramic green sheet for a side margin portion.

In Test Nos. 1 to 6, a ceramic green sheet for an active portion and a ceramic green sheet for a side margin portion having the same composition were used. In Test No. 7 to 30, a content of Si and a content of Al were controlled in the range in which a ratio of a content of Si in a ceramic green sheet for an active portion to a content of Si in a ceramic green sheet for a side margin portion is greater than 0.4 and less than 1.0 and a ratio of a content of Al in the ceramic green sheet for an active portion to a content of Al in the ceramic green sheet for a side margin portion is greater than 0.5 and less than 2.0.

An average size of dielectric grains was measured from an image obtained by scanning the vicinity of a boundary between an active portion and a margin portion at the center of the body in the first direction in a cross section of the body cut in the first and third directions at the center of the body in the second direction, at 50 k magnification using a scanning electron microscope (SEM) available from ZEISS International. Specifically, a size of each grain was calculated by measuring a Ferret diameter of each dielectric grain from the obtained image using Zootos, a grain size measuring software program. Average values of dielectric grains in a region from a boundary between the active portion Ac and the side margin portion 115 to a region spaced apart from the boundary toward the active portion Ac by 3 μm were shown as Da, and average values of dielectric grains in a region from the boundary between the active portion Ac and the side margin portion 115 to a region spaced apart from the boundary outwardly of the side margin portion 115 by 3 μm were shown as Dm.

As for reliability, an accelerated lifespan evaluation was performed, and after 40 sample chips per Test No. were prepared, a sample chip in which insulation resistance was decreased to 10^5Ω or less as a result of applying a voltage that is 1.5 times the reference voltage Vr to these sample chips for 50 hours was determined as a defect, a case in which a defect occurred in all sample chips was expressed as X, a case in which the number of sample chips in which the defect occurred is 25 or more and less than 40 was expressed as Δ, a case in which the number of sample chips in which the defect occurred is 10 or more and less than 25 was expressed as ○, and a case in which the number of sample chips in which the defect occurred is less than 10 was expressed as ◉.

TABLE 1

| Test No. | Da | Dm | Dm/Da | Reliability |
|---|---|---|---|---|
| 1* | 245.30 | 394.78 | 1.61 | X |
| 2* | 146.60 | 241.14 | 1.64 | X |
| 3* | 253.60 | 409.48 | 1.61 | X |
| 4* | 158.61 | 274.76 | 1.73 | X |
| 5* | 155.31 | 233.08 | 1.50 | X |
| 6* | 152.39 | 231.05 | 1.52 | X |
| 7 | 242.83 | 335.39 | 1.38 | ○ |
| 8 | 250.74 | 306.46 | 1.22 | ○ |
| 9 | 277.59 | 348.16 | 1.25 | ○ |
| 10 | 292.81 | 293.91 | 1.00 | ○ |
| 11 | 284.09 | 258.60 | 0.91 | ○ |
| 12 | 270.61 | 257.51 | 0.95 | ○ |
| 13 | 299.16 | 269.85 | 0.90 | ◉ |
| 14 | 348.27 | 320.63 | 0.92 | ◉ |
| 15 | 327.67 | 288.88 | 0.88 | ◉ |
| 16 | 249.86 | 274.76 | 1.10 | ○ |
| 17 | 269.98 | 304.26 | 1.13 | ○ |
| 18 | 245.85 | 266.19 | 1.08 | ○ |
| 19 | 241.15 | 235.56 | 0.98 | ○ |
| 20 | 250.15 | 261.28 | 1.04 | ○ |
| 21 | 260.64 | 264.11 | 1.01 | ○ |
| 22 | 268.54 | 339.83 | 1.27 | ○ |
| 23 | 313.37 | 364.75 | 1.16 | ○ |
| 24 | 235.07 | 231.74 | 0.99 | ○ |
| 25 | 299.60 | 364.48 | 1.22 | ○ |
| 26 | 279.22 | 303.85 | 1.09 | ○ |
| 27 | 291.00 | 335.00 | 1.15 | ○ |
| 28 | 280.78 | 323.72 | 1.15 | ○ |
| 29 | 251.54 | 279.72 | 1.11 | ○ |
| 30 | 288.54 | 302.02 | 1.05 | ○ |

It can be seen that in Test Nos. 1 to 6, Dm/Da is 1.5 or more and all sample chips were determined as a defect, such that reliability was poor.

On the other hand, in Test Nos. 7 to 30, Dm/Da was greater than 0.5 and less than 1.5, such that reliability was excellent.

Meanwhile, as a result of analyzing contents of Si and Al as a line profile in a cross section of a body of the sample chip cut in the first and third directions at the center of a body of the sample chip in the second direction, with a transmission electron microscope-energy disperse X-ray spectrometer (TEM-EDS), Test Nos. 1 to 6 were measured to have the highest contents of Si and Al in m2, and Test Nos. 7 to 30 were measured to have the highest contents of Si and Al in m. Therefore, it can be seen that when the content of Si in m is higher than the content of Si in a and the content of Si in m2, Dm/Da is greater than 0.5 and less than 1.5.

Figure 7:
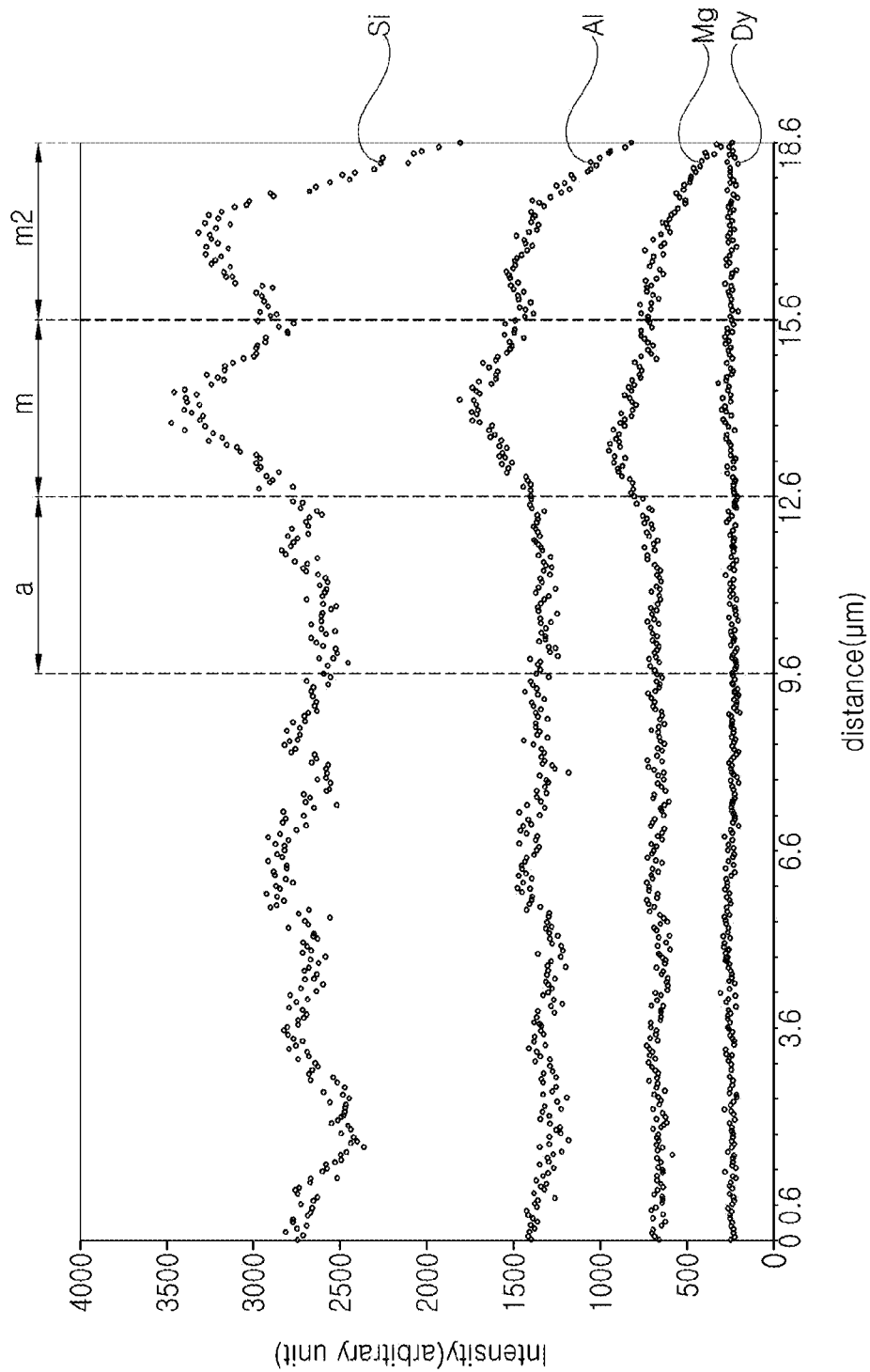
FIG. 7 is a view illustrating a result of line-profiling the vicinity of an interface between an active portion and a margin portion for Test No. 15 using a transmission electron microscope-energy disperse X-ray spectrometer (TEM-EDS)
Figure 8:
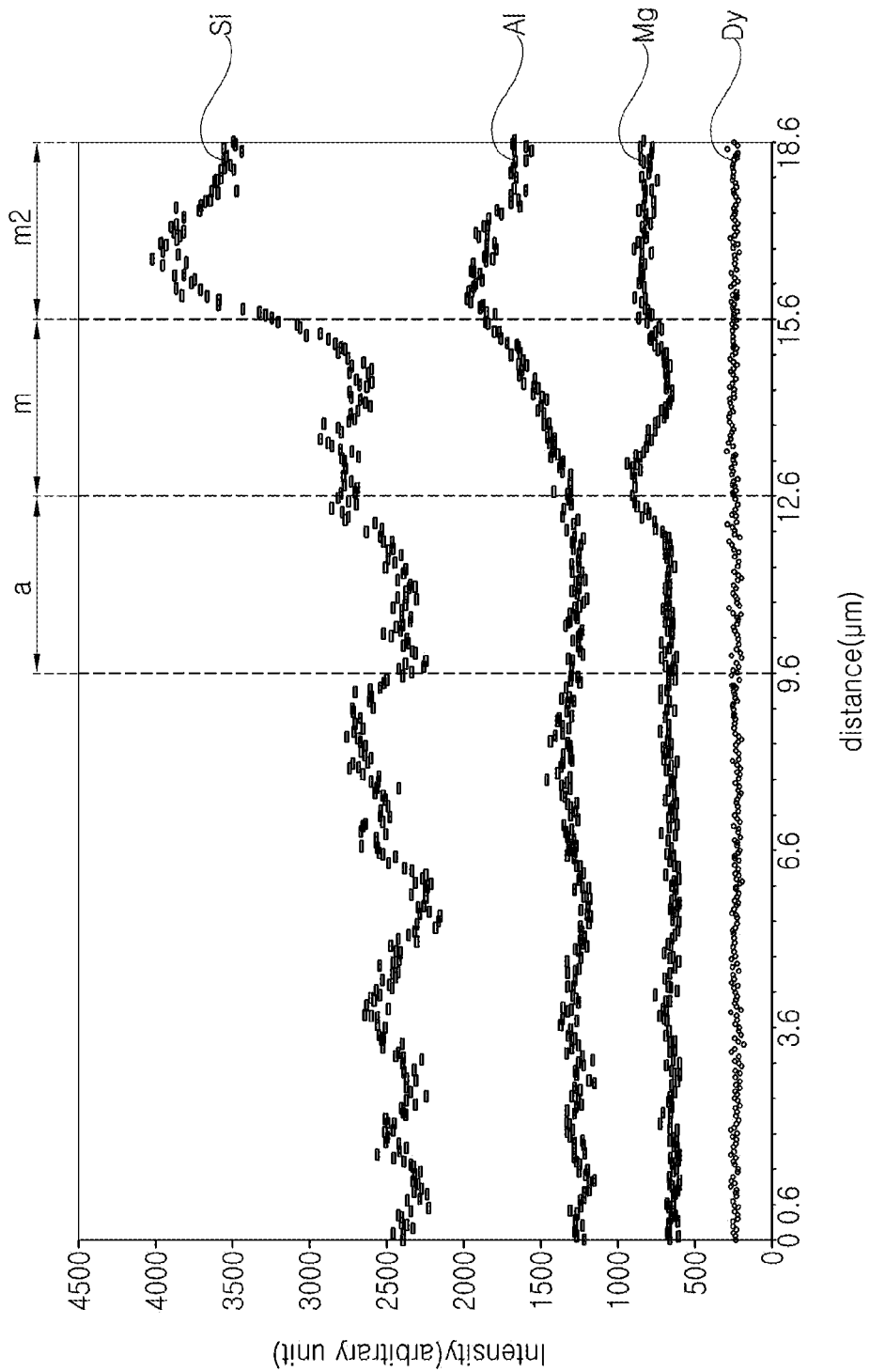
FIG. 8 is a view illustrating a result of line-profiling the vicinity of an interface between an active portion and a margin portion for Test No. 5 using a TEM-EDS.

FIG. 7 is a view illustrating a result of line-profiling the vicinity of an interface between an active portion and a margin portion for Test No. 15 using a TEM-EDS, and FIG. 8 is a view illustrating a result of line-profiling the vicinity of an interface between an active portion and a margin portion for Test No. 5 using a TEM-EDS. Referring to FIG. 6, FIGS. 7 and 8 illustrate 7 and 8 illustrate results of analyzing the vicinity of the interface between the active portion and the margin portion at the center of a body of each sample chip the first direction in a cross section of the body of each sample chip cut in the first and third directions at the center of the body of each sample chip in the second direction as line profiles along L1. In FIGS. 7 and 8, a Y-axis is not an absolute value, but is an intensity (arbitrary unit), and measured intensities for each element were shifted and illustrated in the Y-axis direction so as to be easily compared with each other.

In FIG. 7, it can be seen that contents of Si and Al have peak values in a region m, and are higher in the region m than in a region m2. On the other hand, in FIG. 8, it can be seen that contents of Si and Al have peak values in a region m2, and are lower in a region m than in the region m2.

Table 2 shows contents of each element in a and m by analyzing FIGS. 7 and 8. In Table 2, average contents of each element based on 100 mol of $BaTiO_3$ in a or m were shown as the contents of each element.

TABLE 2

| | Test No. | | | |
|---|---|---|---|---|
| | 5* | | 15 | |
| Region | a | m | a | m |
| Mg | 0.1 | 0.1 | 0.1 | 0.3 |
| Al | 1.3 | 1.4 | 1.3 | 1.8 |
| Si | 1.8 | 1.9 | 1.8 | 3.7 |
| Dy | 1.3 | 1.5 | 1.3 | 1.8 |

In Test No. 5, an average content of Si in m is similar to an average content of Si in a. On the other hand, it can be seen that in Test No. 15, an average content of Si in m is two times or more higher than an average content of Si in a, and the average content of Si in m is 3.7 mol based on 100 mol of $BaTiO_3$.

As set forth above, according to an exemplary embodiment in the present disclosure, the reliability of the multilayer electronic component may be improved by controlling the contents of Si for each position.

In addition, the difference in the size between the dielectric grains of the active portion and the side margin portion may be decreased.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
a body including dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction;
side margin portions disposed on the fifth and sixth surfaces, respectively; and
external electrodes disposed on the third and fourth surfaces, respectively,
wherein the body includes an active portion including internal electrodes disposed alternately with the dielectric layers in the first direction and cover portions disposed on opposite end surfaces of the active portion in the first direction, respectively,
the dielectric layers and the side margin portions include Si, and an average content of Si in 'm' is higher than an average content of Si in 'a' and an average content of Si in 'm2,' in which 'a' is a region from a boundary between the active portion and the side margin portions to a region spaced apart from the boundary toward the active portion by 3μm, 'm' is a region from the boundary between the active portion and the side margin portions to a region spaced apart from the boundary outwardly of the side margin portions by 3μm, and 'm2' is a region from 'm' to a region spaced apart from 'm' outwardly of the side margin portions by 3μm,
Dm/Da is greater than 0.5 and less than 1.5 in which Da is an average size of dielectric grains in 'a' and Dm is an average size of dielectric grains in 'm,' and
the average size of dielectric grains in 'm' is different than an average size of dielectric grains in 'm2'.

2. The multilayer electronic component of claim 1, wherein the dielectric layers and the side margin portions further include Al, and
an average content of Al in 'm' is higher than an average content of Al in 'a' and an average content of Al in 'm2'.

3. The multilayer electronic component of claim 2, wherein peak values of a content of Si and a content of Al in 'm' are higher than those of a content of Si and a content of Al in 'm2'.

4. The multilayer electronic component of claim 3, wherein a distance difference between a point at which the content of Si has peak value in 'm' and a point at which the content of Al has peak value in 'm' is 0.3 μm or less.

5. The multilayer electronic component of claim 3, wherein the average content of Si in 'm' is 2 mol or more and 7 mol or less based on 100 mol of $BaTiO_3$.

6. The multilayer electronic component of claim 5, wherein the average content of Al in 'm' is 1.5 mol or more and 3 mol or less based on 100 mol of $BaTiO_3$.

7. The multilayer electronic component of claim 6, wherein the dielectric layers and the side margin portions further include one or more of Mg and Dy.

8. The multilayer electronic component of claim 1, wherein the dielectric layers include a first material comprising sintered first ceramic green sheets stacked in the first direction, and
the side margin portions include a second material comprising sintered second ceramic green sheets stacked in the third direction.

9. The multilayer electronic component of claim 8, wherein 0.4<C1a/C2a<1 and 0.5<C1b/C2b<2 in which C1a and C1b are contents of Si and Al based on 100 mol of $BaTiO_3$ of the first ceramic green sheets, respectively, and C2a and C2b are contents of Si and Al based on 100 mol of $BaTiO_3$ of the second ceramic green sheets, respectively.

10. The multilayer electronic component of claim 1, wherein the external electrodes include a first external electrode disposed on the third surface and a second external electrode disposed on the fourth surface and the internal electrodes include first internal electrodes in contact with the first external electrode and second internal electrodes in contact with the second external electrode, and
both end portions of the first and second internal electrodes in the third direction are in contact with the side margin portions.

11. A multilayer electronic component comprising:
a body including dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction;
side margin portions disposed on the fifth and sixth surfaces, respectively; and
external electrodes disposed on the third and fourth surfaces, respectively,
wherein the body includes an active portion including internal electrodes disposed alternately with the dielectric layers in the first direction and cover portions disposed on opposite end surfaces of the active portion in the first direction, respectively,
Dm/Da is greater than 0.5 and less than 1.5 in which 'a' is a region from a boundary between the active portion and the side margin portion to a region spaced apart from the boundary toward the active portion by 3 μm, Da is an average size of dielectric grains in 'a', 'm' is a region from the boundary between the active portion and the side margin portions to a region spaced apart from the boundary outwardly of the side margin portions by 3 μm, and Dm is an average size of dielectric grains in 'm', and
an average content of aluminum in 'm' is greater than an average content of aluminum in a region 'm2' which is a region continuous from 'm' to a region spaced apart from 'm' outwardly of the side margin portions by 3 μm.

12. The multilayer electronic component of claim 11, wherein Dm/Da is in a range from 0.88 to 1.38.

13. The multilayer electronic component of claim 11, wherein the dielectric layers and the side margin portions include Si, and an average content of Si in 'm' is higher than an average content of Si in 'a' and an average content of Si in 'm2'.

14. A multilayer electronic component, comprising:
an active portion having internal electrodes disposed alternately with dielectric layers interposed therebetween, the internal electrodes and the dielectric layers being stacked in a thickness direction, the dielectric layers comprising aluminum;
side margin portions disposed on width-wise opposing surfaces of the active portion, the side margin portions comprising aluminum; and
external electrodes disposed on length-wise opposing surfaces of the active portion,
wherein an average content of aluminum in a region 'm' in the side margin portions spaced apart from a boundary between the active portion and the side margin portions by a distance of 3 μm is greater than an average content of aluminum in a region 'm2' in the side margin portions spaced further apart from the region 'm' a distance of 3 μm, and wherein the dielectric layers and the side margin portions further include Si, and wherein peak values of a content of Si and a content of Al in 'm' are higher than those of a content of Si and a content of Al in 'm2'.

15. The multilayer electronic component of claim 14, wherein Dm/Da is between 0.5 and 1.5, wherein Da is an average size of dielectric grains in a region 'a' in the active portion spaced apart from a boundary between the active portion and the side margin portions by a distance of 3 μm, and Dm is an average size of dielectric grains in the region 'm'.

16. The multilayer electronic component of claim 14, wherein an average content of Si in the region 'm' is higher than an average content of Si in the region 'm2' and an average content of Si in a region 'a' in the active portion spaced apart from a boundary between the active portion and the side margin portions by a distance of 3 μm.

17. The multilayer electronic component of claim 14, wherein the dielectric layers and the side margin portions further include one or more of Mg and Dy.

18. The multilayer electronic component of claim 14, wherein the dielectric layers include a first material comprising sintered first ceramic green sheets stacked in the thickness direction,
the side margin portions include a second material comprising sintered second ceramic green sheets stacked in the width direction, and
$0.4 < C1a/C2a < 1$ and $0.5 < C1b/C2b < 2$ in which C1a and C1b are contents of Si and Al based on 100 mol of $BaTiO_3$ of the first ceramic green sheets, respectively, and C2a and C2b are contents of Si and Al based on 100 mol of $BaTiO_3$ of the second ceramic green sheets, respectively.

* * * * *